United States Patent [19]

Hall

[11] Patent Number: 4,640,386

[45] Date of Patent: Feb. 3, 1987

[54] FOLDING UTILITY HORSE

[76] Inventor: James W. Hall, 3713 NE. 22nd Ave., Portland, Oreg. 97212

[21] Appl. No.: 829,213

[22] Filed: Feb. 14, 1986

[51] Int. Cl.[4] ........................ B27B 21/00; F16M 11/00

[52] U.S. Cl. .................................... 182/155; 182/186; 182/226

[58] Field of Search ................ 182/155, 153, 181-186, 182/224-226; 269/289 R, 901

[56] References Cited

U.S. PATENT DOCUMENTS

| | | | |
|---|---|---|---|
| 318,896 | 5/1885 | Hanssen | 182/155 |
| 1,303,416 | 5/1919 | Tidyman | 182/155 |
| 1,778,566 | 10/1930 | Pitner | 182/155 |
| 2,216,187 | 10/1940 | Dion | 182/155 |
| 2,824,771 | 2/1958 | Blenski | 182/155 |
| 3,700,072 | 10/1972 | Lovett | 182/155 |
| 3,978,943 | 9/1976 | Greenman | 182/155 |
| 4,375,245 | 3/1983 | Schill | 182/155 |
| 4,515,243 | 5/1985 | Prior | 182/155 |

*Primary Examiner*—Reinaldo P. Machado

*Attorney, Agent, or Firm*—Glen A. Collett

[57] ABSTRACT

A compactly folding sawhorse including a main beam and a pair of legs double pivoted thereto at each end thereof, and an assembly for aligning and securing the legs in their extended position forming a very stable and durable work platform.

16 Claims, 6 Drawing Figures

FIG. 1
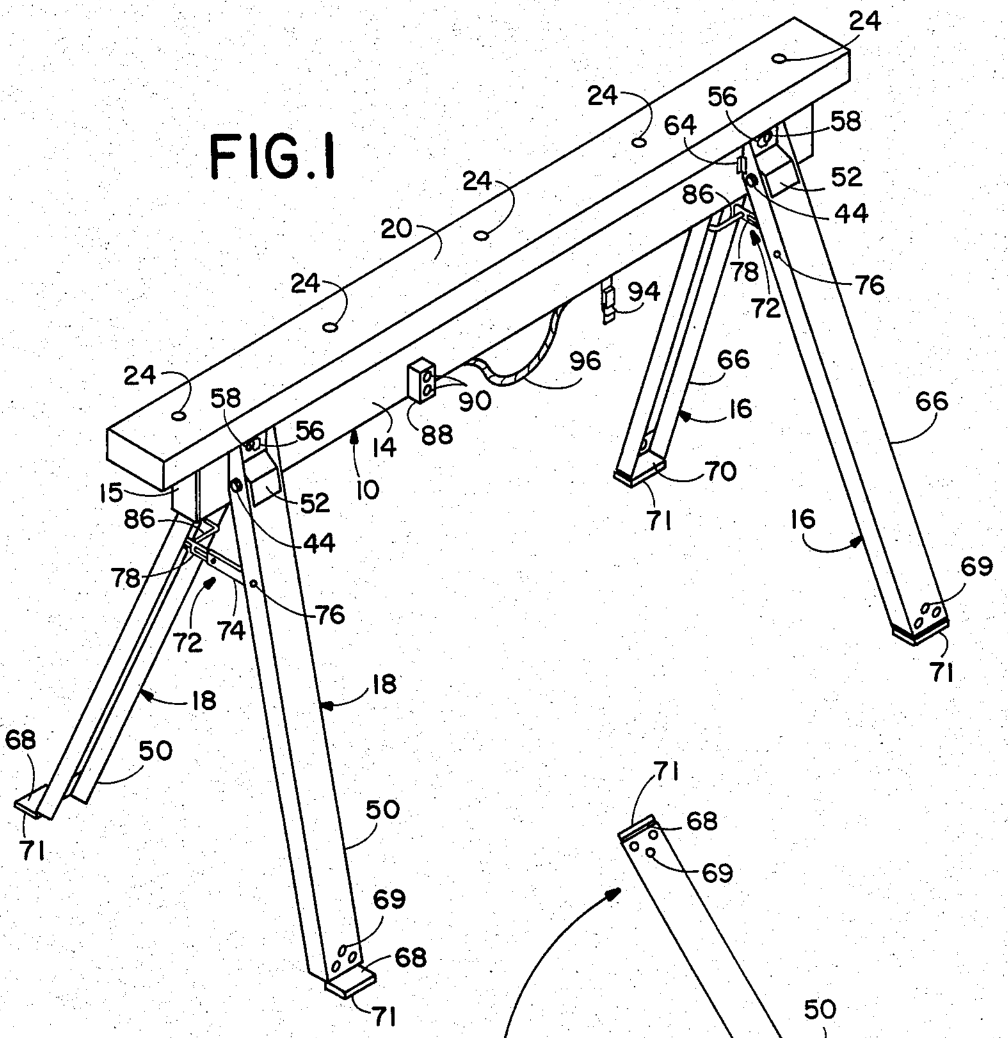
FIG. 3
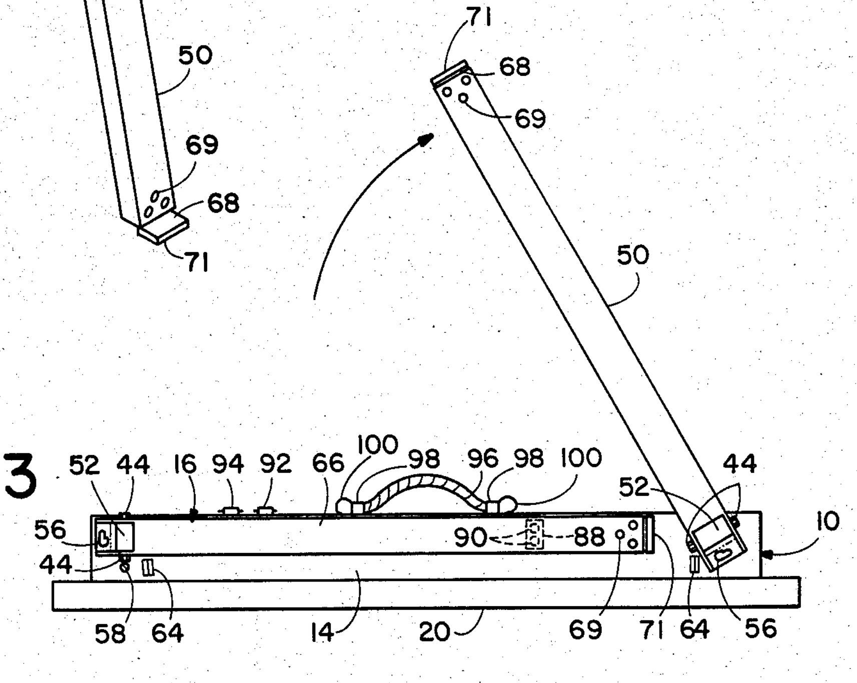
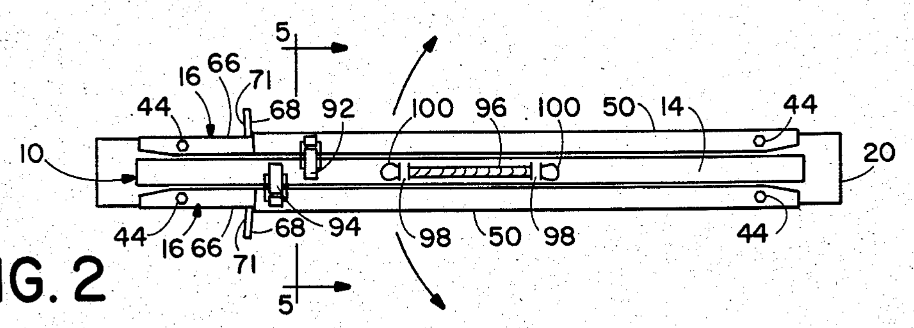
FIG. 2

FOLDING UTILITY HORSE

BACKGROUND OF THE INVENTION

This invention relates to sawhorses, and more particularly to folding sawhorse assemblies which are collapsible for easy transport and storage.

Most sawhorses are simply made out of lumber nailed together to provide a support at the appropriate height. As it is well known, many trades employ the use of such sawhorses, and in many cases they are simply built on the job and used until they wear out. A problem surfaces when it comes time to move from one job to the next, for the conventional sawhorses are bulky and unwieldy. In another instance, sometimes homeowners have need for a set of quality sawhorses, but usually the sawhorses are in storage and thus take up considerable room in the garage or shop.

There exists a need for a high quality sawhorse which can be folded compactly for storage and transport. Some prior references disclose sawhorses and brackets for sawhorses which can be folded in one manner or another. These prior art sawhorses are, in general, not sturdy enough to tolerate regular use compounded by being roughly tossed about when folded. In some cases the design is such that they are simply not all that compact when folded. In other cases they are not sturdy enough to be trusted with a person's weight and balance.

Accordingly, the general object of the present invention is to provide a folding sawhorse which is very sturdy and durable, and which folds to a very compact package.

Another object is to provide a sawhorse which is complete, not requiring additional components.

Yet another object is to provide a sawhorse of a size commonly used by most trades.

A further object is to provide a safe assembly, which will resist wear and remain reliable for a long period of time.

A still further object is to provide a sawhorse which may be stored in a small space.

Yet another object is to provide a sawhorse which is easy to carry when folded.

And a further object is to provide an assembly which is easy to set up quickly.

These and other objects and advantages and the manner in which they are achieved will become apparent as the specification and claims proceed, taken in conjunction with the drawings which illustrate the preferred embodiment.

SUMMARY OF THE INVENTION

In its basic concept the present invention is a sawhorse or utility horse which includes a main beam, two pairs of legs attached to and depending from the main beam, the legs being doubly pivoted at their attachment point for folding up alongside the main beam, and stop means for securing means for positioning and fastening the legs in their extended position.

BRIEF DESCRIPTION OF THE DRAWINGS

FIG. 1 is a top perspective view of the folding utility horse of the present invention, shown in its set-up position.

FIG. 2 is a view of the bottom of the utility horse of FIG. 1 when collapsed.

FIG. 3 is a side view of the partially collapsed utility horse.

DESCRIPTION OF THE PREFERRED EMBODIMENT

Figure 4:
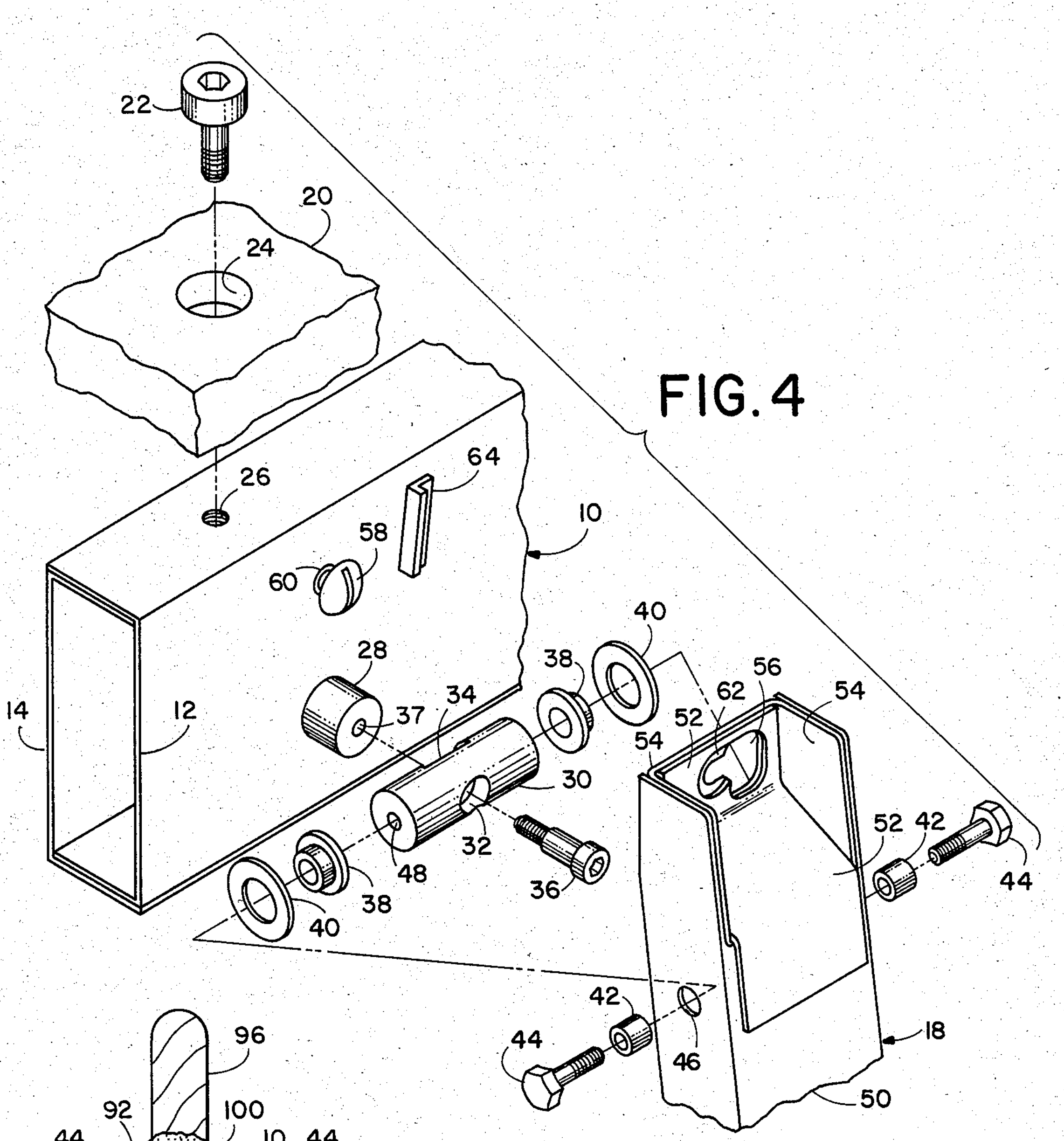
FIG. 4 is a top perspective fragmentary exploded view of the pivot assembly of the present invention.

With particular attention to FIGS. 1 and 4, the sawhorse or utility horse of the present invention includes a main beam, shown generally at 10, which provides the structural support for work placed on the sawhorse. The main beam is preferably made of metal, as are the rest of the structural components of the sawhorse. The main beam is composed of channels 12 and 14, which are overlapped on the top and bottom, and welded together. An end cap 15 is provided for the ends of the main beam as shown in FIG. 1.

Two sets of leg assemblies are provided, one on each end of main beam 10. Inside legs 16 and outside legs 18 are very similar but for minor differences as will be discussed.

A wooden board or block 20 is fastened on top of main beam 10 by bolts 22 which fit into countersunk holes 24 and screw into threaded holes 26 in the top of the main beam. The purpose of the block is to provide a surface which will not damage a saw or the like if the top of the sawhorse is accidently cut into. The block may be replaced after much use if so desired.

The leg assemblies are attached to the main beam by a transverse mount 28, which is a rod extending through and welded into a hole in main beam 10. On the end of the mount is a rotating cross shaft 30 which includes a countersunk hole 32 and an opposing flat 34 which is configured to abut the end of the mount. A shoulder bolt 36 extends through hole 32 and into a threaded hole 37 in the end of mount 28 and forms a spindle about which cross shaft 30 may freely rotate. At each end of the cross shaft is a bushing 38, a washer 40 which is configured to fit on the shoulder of the bushing to properly space the assembly for the second set of legs, a spacer 42 which fits the inside of the bushing, and a bolt 44 which extends through the spacer, bushing and washer, through a hole 46 in the side wall of the leg, and screws into a threaded hole 48 in the end of the cross shaft. Bushing 38 bears on the leg in the wall of hole 46, while bolt 44 is cinched against spacer 42. Thus, a freely rotatable bearing surface is provided between the spacer and bushing. This pivot means allows each leg to be doubly pivoted to the main beam, and thus be able to swing from a collapsed position wherein the leg is alongside the main beam to an extended or set-up position, wherein the leg is angled outwardly at about 30 degrees and inclined longitudinally outwardly approximately 10 degrees.

Preferably the legs 16 and 18 are made of channel material, and are preferably of metal such as steel, as is most of the rest of the structural parts of the sawhorse. The outside legs include channel 50, and at their upper end, above the pivot point, a stop means and securing means for locating and fastening the legs in their extended positions. The outside of the top of the leg is cut away, and a plate 52 is attached between the upstanding side ears of the channel. The plate angles inwardly, and forms a surface at the inside of the top of the leg which is at an angle which corresponds to the compound angle of the leg extending outwardly away from the main beam 10. An insert 54 is also welded into the top of the leg, providing a double sheet of material at the side adjacent the main beam. A hole 56 is provided through this double sheet, which is operable to overlap a bolt 58 which is threaded into a T-nut lodged in the side wall of main beam 10. The hole is configured with a large opening on the side toward the center of the sawhorse, through which the head of the bolt can pass. Then, communicating therewith is a slot in the sheet of the material lying adjacent the main beam. The head of the bolt can bear against the sides of the slot, as denoted at 62. The outer sheet of material is configured and dimensioned to receive and confine the head of the bolt. In this way the bolt in conjunction with the slot serves both the purpose of a stop means for locating the position of the leg and as a securing means for fastening the leg in its extended position.

Another stop means is provided as an abutment member 64 which is welded to the main beam and provides a positive and secure stop against which the top of the inside of the leg abuts when the leg is in its extended position. Accordingly, the motion of extending the leg includes swinging it to a position of downward and outward extension with respect to the normal upright position of the sawhorse, moving the hole over the head of the bolt, swinging it until it hits the abutment, and then tightening the bolt to grip the sides of the slot.

The first pair of legs 16 differ from the exploded view of FIG. 4 in that the channel member 66 is slightly narrower than the channel member 50. Accordingly, washers 40 are left out of the pivot assembly.

The ends of legs 18 and 16 include feet 68 and 70, respectively. When folded, legs 18 overlap legs 16, and as a consequence feet 68 extend outwardly while feet 70 extend inwardly. Both are secured to the channels by rivits 69. Both have pads, preferably of rubber material on their bottoms, as shown at 71.

Figure 6:
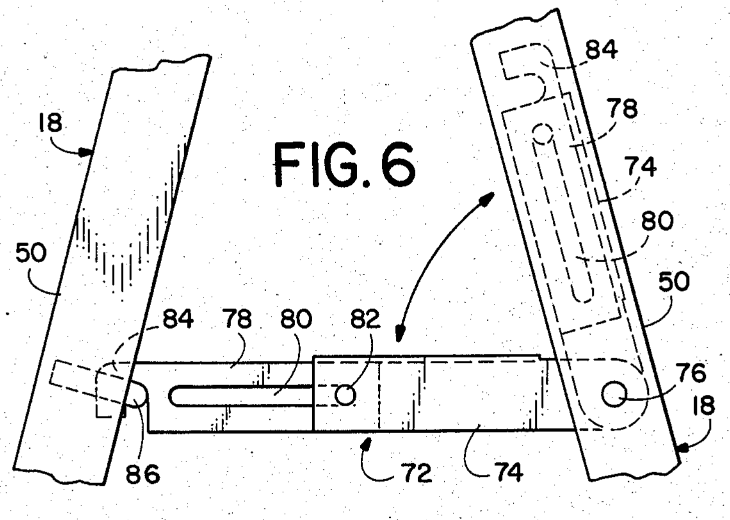
FIG. 6 is a fragementary view of the end of one of the leg assemblies, illustrating the cross brace between the legs.

In order to further support the legs and keep them from spreading when the sawhorse is in use, a crossbrace, denoted generally at 72 is provided on each set of legs. The crossbrace is best shown in FIG. 6, and includes an outside piece 74 pivoted to one of the legs at 76, and a slider 78 which telescopes into the outside peice. The slider has a slot 80 therein, which fixes the extent of travel by a rivet 82 through the outside peice and through the slot. The outer end of the slider is formed into a hook 84 which overlaps a loop 86 attached to the opposite leg. There is only a little room on the inside upper part of the outer legs, and by making the crossbrace telescopic it is possible to span the widest possible distance. A similar crossbrace is located on the other pair of legs as well.

Figure 5:
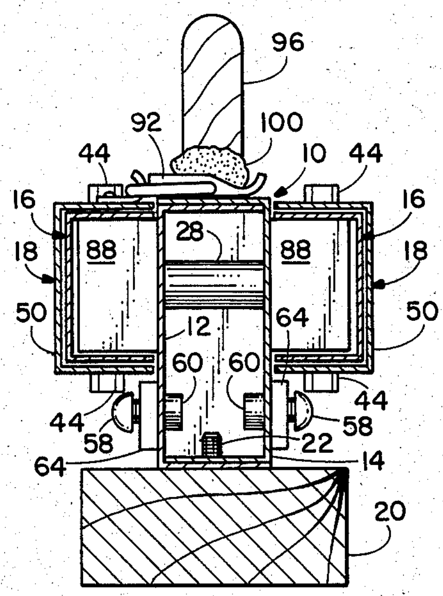
FIG. 5 is a section taken along the line 5—5 of FIG. 2.

FIG. 5 illustrates that in the folded sawhorse alignment blocks 88, fastened onto the main beam by screws 90, provide an initial location for the securing of first legs 16. The blocks are dimensioned to provide a friction fit to hold the legs in place when folding, and to not allow vibration when in transport. The outer legs 18 fold over the inner legs and are secured to the main beam by latches 92 and 94.

The bottom of the main beam mounts a handle 96, which preferably is a piece of plastic rope or the like. It is threaded through two raised loops 98 of main beam 10, and then its ends are melted as at 100.

The sawhorse of the present invention is most easily folded, unfolded, transported and stored upside down, resting on block 20 or carried by handle 96. However, the directions referred to are of the upstanding sawhorse in its position of normal use.

OPERATION

The set up of the utility horse or sawhorse of the present invention is as follows.

First, the sawhorse is rested upside down on block 20 and latches 92 and 94 are released. Then the outside legs 18 are swung outwardly in the manner shown by the arrows in FIG. 2. As soon as the outside legs clear the inside legs, the outside legs are swung upwardly as shown by the arrow of FIG. 3. Hole 56 is then placed over the head of bolt 58, and the leg is rotated about the pivot until the side of the leg contacts abutment 64. Then bolt 58 is tightened against the sides of slot 62. After completing the same process with each of the four legs, the sawhorse is turned over to an upright position and is ready for use.

The process for collapsing the sawhorse is simply the reverse of the set up procedure. Once completely folded, the sawhorse forms a compact package as shown in FIG. 2.

This design of sawhorse is very stable and durable and has many advantages for use in construction trades, and also for the homeowner.

Having described my invention in its preferred embodiment, I claim:

1. A folding utility horse comprising:

(a) a main beam extending horizontally when the utility horse is in its set-up position;

(b) a first pair of legs attached to and positioned at one end of the main beam;

(c) a second pair of legs attached to and positioned at the other end of the main beam;

(d) pivot means mounting each leg, the pivot means including:

(1) a transverse mount extending outwardly from the main beam;

(2) a cross shaft mounted pivotally substantially at right angles to the transverse mount; and (3) bearing means for mounting the leg pivotally on the cross shaft for pivotal movement along an axis substantially perpendicular to the axis of the pivot between the transverse mount and the cross shaft;

(e) stop means for abutment by the leg when the leg is in its extended position; and (f) securing means for releasably fastening the leg in its extended position.

2. The folding utility horse of claim 1 wherein the main beam comprises a rectangular metal tube.

3. The folding utility horse of claim 2 further comprising end caps for the main beam.

4. The folding utility horse of claim 1 further comprising a wooden block attached along the top of the length of the main beam.

5. The folding utility horse of claim 1 wherein the legs are of channel material, the open channel of the second pair of legs being dimensioned to overlap the first pair of legs when folded.

6. The folding utility horse of claim 5 further comprising an alignment block attached to each side of the main beam and wherein the first pair of legs are configured to overlap the alignment block.

7. The folding utility horse of claim 5 further comprising feet on the ends of the legs, the feet of the first pair of legs extending inwardly, and the feet of the second pair of legs extending outwardly.

8. The folding utility horse of claim 1 further comprising latches between the main beam and the second pair of legs for securing the legs when folded.

9. The folding utility horse of claim 1 further comprising a handle attached to the bottom of the main beam for carrying upside down when folded.

10. The folding utility horse of claim 1 further comprising a cross brace attached to one of each of the pairs of legs midway along its length and being releasably engageable with the other associated leg.

11. The folding utility horse of claim 10 wherein the cross braces are telescopic.

12. The folding utility horse of claim 1 wherein the legs are pivoted to the cross shaft by an assembly including a bushing, a cylindrical spacer extending through the bushing and a bolt extending through and clamping the spacer to the cross shaft, the outside of the bushing bearing against a hole in the leg.

13. The folding utility horse of claim 1 wherein the stop means comprises an abutment attached to the main beam against which the side of the leg bears when set up.

14. The folding utility horse of claim 1 wherein the stop means comprises a bolt extending from the main beam which is overlapped by a hole in the leg.

15. The folding utility horse of claim 1 wherein the securing means comprises a bolt threaded into the main beam and extending through a hole in the leg and operable to be tightened against the leg.

16. The folding utility horse of claim 15 wherein the leg comprises a double sheet of material at its upper end through which is the hole that the bolt extends, and wherein the back sheet of material is slotted allowing the head of the bolt to bear thereagainst, while the front sheet of material is configured and dimensioned to accept and confine the head.

* * * * *